(12) United States Patent
Simongini et al.

(10) Patent No.: US 9,077,763 B2
(45) Date of Patent: Jul. 7, 2015

(54) STREAMING MEDIA INTERRUPTION AND RESUMPTION SYSTEM

(75) Inventors: Alberto Simongini, Rome (IT);
Nicoletta Celandroni, Rome (IT);
Larry M. Socher, Oakton, VA (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 1893 days.

(21) Appl. No.: 12/060,739

(22) Filed: Apr. 1, 2008

(65) Prior Publication Data

US 2009/0204719 A1 Aug. 13, 2009

(30) Foreign Application Priority Data

Feb. 8, 2008 (EP) .................................... 08425076

(51) Int. Cl.
*H04L 29/08* (2006.01)
*H04W 4/02* (2009.01)
*H04L 29/06* (2006.01)

(52) U.S. Cl.
CPC ................. *H04L 67/24* (2013.01); *H04W 4/02* (2013.01); *H04W 4/021* (2013.01); *H04L 65/1089* (2013.01); *H04L 67/306* (2013.01); *H04L 67/18* (2013.01)

(58) Field of Classification Search
USPC ........................................................ 709/231
See application file for complete search history.

(56) References Cited

U.S. PATENT DOCUMENTS 7,720,983 B2 * 5/2010 Klemets et al. ............... 709/231
2003/0088686 A1 * 5/2003 Jennings ........................ 709/231
2004/0107449 A1 * 6/2004 Fukuda et al. ................. 725/135
2005/0262251 A1 * 11/2005 Klemets et al. ............... 709/230
2008/0008439 A1 * 1/2008 Liu et al. .......................... 386/46
2008/0077702 A1 * 3/2008 Posamentier ................. 709/232
2009/0006631 A1 * 1/2009 Green ............................ 709/227
2009/0006643 A1 * 1/2009 Lee ................................ 709/231
2009/0190582 A1 * 7/2009 Nambiath et al. ............. 370/389
2009/0216351 A1 * 8/2009 Van Horck et al. ............. 700/94
2009/0216897 A1 * 8/2009 Wang ............................ 709/231
2009/0276535 A1 * 11/2009 Saunders et al. .............. 709/229

FOREIGN PATENT DOCUMENTS

| EP | 1 549 096 A1 | 6/2005 |
| JP | 2004134868 | 4/2003 |
| WO | WO 02/084971 | 10/2002 |
| WO | WO 2004/030310 | 4/2004 |

OTHER PUBLICATIONS

Liu, C., Multimedia Over IP: RSVP, RTP, RTCP, RTSP, www.cis.ohio-state.edu/~jain/cis788-97/ip_multimedia/index.htm, 24 pages, Feb. 7, 2000.

(Continued)

*Primary Examiner* — Aaron Strange
*Assistant Examiner* — James Edwards
(74) *Attorney, Agent, or Firm* — Brinks Gilson & Lione

(57) ABSTRACT

A media delivery system enhances subscriber experience with streaming media. The media delivery system supports delivery of primary media content to the subscriber, but also provides secondary media content delivery, such as location based media delivery, that may interrupt the primary media content. The media delivery system coordinates delivery of the primary media stream and the location based media stream so that the primary media stream resumes delivery from the point of interruption when the secondary media stream finishes.

12 Claims, 14 Drawing Sheets

(56) References Cited

OTHER PUBLICATIONS

Adobe, TechNote, HTTP Tunneling Protocols: RTMP, RTMPT and RTMPS, 2 pages, Dec. 14, 2004.
Schulzrinne, H. et al., Real time Streaming Protocol (RTSP), Internet Engineering Task Force, Internet Draft, 74 pages, Feb. 2, 1998.
Farland, P., Using RPC Services in Flex Data Services 2, Adobe, 14 pages, Undated.
Gibson et al., Principals of Analog Communications, Second Edition, Chapter 6, pp. 139-161, 1993.

* cited by examiner

STREAMING MEDIA INTERRUPTION AND RESUMPTION SYSTEM

PRIORITY CLAIM

This application claims priority to EPO application serial number 08425076.0, titled Streaming Media Interruption and Resumption System, filed Feb. 8, 2008.

BACKGROUND OF THE INVENTION

1. Technical Field

This application relates to content delivery through a data network. In particular, this application relates to interrupting and resuming content delivery to service subscribers.

2. Related Art

Rapid advances in computing and communication technology, driven by strong market demand, have led to nearly universal adoption of cell phones, personal music and video playback devices, and other types of portable media players. In some instances, these devices can receive and play back streaming media. Thus, as opposed to requiring the device to locally store all of its media content, the device may instead receive, a small portion at a time, the media for playback.

SUMMARY

A media delivery system enhances subscriber experience with streaming media. The system delivers primary media content, such as streaming music of songs on a playlist, to the subscriber and also provides secondary media delivery that may interrupt the primary media content. The media delivery system coordinates delivery of the primary media stream and the secondary media stream such that the primary media stream resumes delivery from the point of interruption. One beneficial result is that the subscriber receives and experiences the full content of the primary media stream, even though interrupted by the secondary media content.

In one implementation, the system initiates delivery of a primary media stream to an endpoint and interrupts the primary media data stream at an interruption point. The system then initiates delivery of a secondary media stream to the endpoint. When the secondary media stream ends (or at another selectable time or event), the system resumes delivery of the primary media stream to the endpoint from the interruption point.

The secondary media stream may be a location based media stream. In that regard, the system may obtain an endpoint location and trigger interruption of the primary media data stream in response to the endpoint location. Thus, the location based media stream may provide traffic updates, weather updates, emergency alerting, advertising or other types of media content keyed on the location of the subscriber. A location server may provide the endpoint location to the system, using, for example, latitude and longitude coordinates. In addition, the system may determine whether the subscriber has an active subscription to any particular type of information, prior to delivering the secondary media stream to the subscriber.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
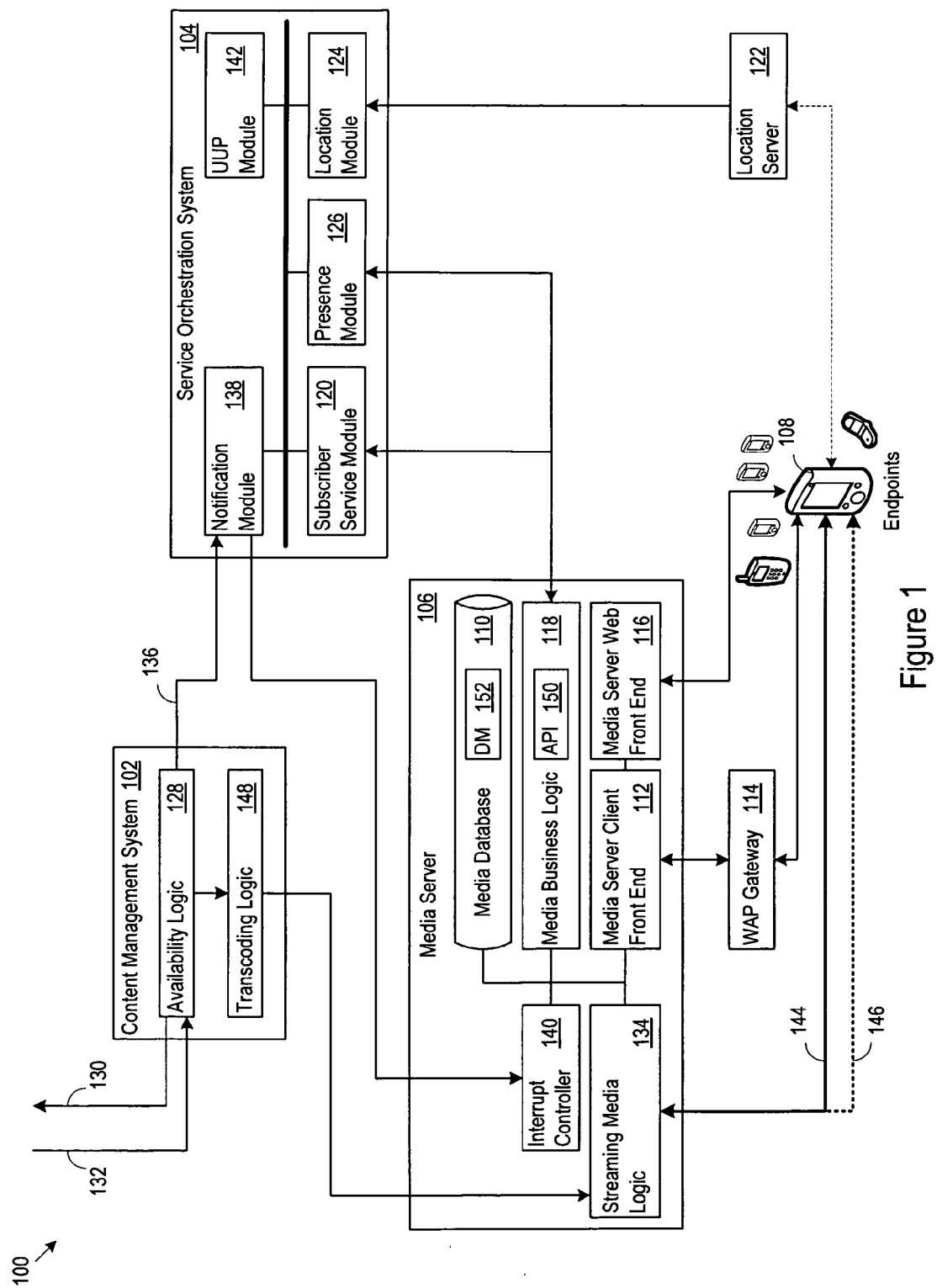
FIG. 1 shows a media delivery system.

FIG. 1 shows a media delivery system ("delivery system") 100. The delivery system 100 includes a content management system ("CMS") 102, service orchestration module 104, and a media server 106 in communication with an endpoint 108. The endpoint 108 may take many different forms, including a cell phone, smart phones, pocket PCs, a computer system, personal data assistant, portable email device, a process running on a machine, or any other endpoint to which the delivery system 100 delivers information.

The media server 106 includes a media database 110. The media database 110 stores media data for streaming to the endpoint 108 and may implement a particular data model 152, discussed below in connection with FIG. 14. The media data may represent many different types of content, such as music, video, audio announcements, audio books, tones, alarms, sirens, or other media. The media data make take many different forms, including Flash (e.g., FLV or SWF), audio specific (e.g., FLAC, MP3, or WAV), video specific (e.g., AVI, MPG, or WMV) or other forms.

The endpoint 108 may connect to the media server 106 in different ways. For example, FIG. 1 shows a client front end 112 connecting the endpoint 108 through a wireless access point (WAP) gateway 114. The WAP gateway 114 may provide additional information to the media server 106, such as the Mobile Subscriber Integrated Services Digital Network (MSISDN) number, radio access type, and other access parameters that may be relevant to the endpoint 108. Another example interface is the network (e.g., Web) front end 116 that connects to the endpoint 108 through a web browser or other network connection.

The front ends 112 and 116 support interaction with the endpoint 108 and with the media business logic 118 through a business logic application programming interface (API) 150. As one example, the client front end 112 may interact with client logic running on the endpoint 108. In that regard, the client front end 112 may conserve valuable network bandwidth by communicating playlist information, streaming URL information, and any other type of information without the need to communicate presentation elements (e.g., complex GUIs) to the endpoint 108.

On the other hand, the web front end 116 may provide a user-friendly man-machine interface. The endpoint 108 employs the web front end 114 to handle subscriber setup, playlist setup and modification, preference modifications, logon and authentication, and other interface tasks. As a specific example, the endpoint 108 may logon to the media server 106 through the web front end 116, specify songs, and insert the songs into playlists for later access and playback.

The endpoint 108 may logon to the media server 106 through the web front end 116 using, for example, a username/password authentication and authorization technique. Alternatively, the endpoint 108 may use an MSISDN identifier to access the media server 106. In that regard, the Unified User Profile (UUP) module 142 in the SO system 104 may obtain the MSISDN from the media server 106 and process the MSISDN identifier. More specifically, the UUP module 142 may attempt to match the MSISDN against a user profile in a subscriber account. If a match is found, the UUP module 142 may examine the user profile to verify whether the endpoint 108 has an account identifier for a valid active subscription the media server 106.

The front ends 112 and 116 may coordinate with the business logic 118 to accept subscription service requests, service payments, media selections, and other information from the endpoint 108. As one example, the endpoint 108 may upload, define, or create playlists of desired songs, videos, or other media on the media server 106. In addition, the media server 106 accepts input regarding endpoint characteristics, e.g., directly from the endpoint 108. The endpoint characteristics 108 may include subscribed content or content of interest (e.g., music, videos, weather alerts, traffic alerts, emergency alerts, and news bulletins), age, interests, field of employment, or other characteristics.

The media server 106 front ends 112 and 116 also accept endpoint instructions to begin playback of media. For example, the endpoint 108 may communicate a request to the media server 106 to begin playback of songs within a playlist. The media server 106 may then retrieve the playlist, identify each media entry, retrieve the matching media content from the media database 110, and stream the media to the endpoint 108.

The media server 106 may maintain the subscription information and endpoint characteristics locally, or additionally or alternatively may coordinate subscription information with other systems. For example, the media server 106 may communicate subscription requests, subscriber characteristics, or other information to the service orchestration system ("SO system") 104. The subscriber service module 120 in the SO system 104 may coordinate maintenance of a central repository of endpoint information, including account status, endpoint identifiers, and payment information.

In addition, the SO system 104, the media server 106, or the endpoint 108 may request location updates for the endpoint 108 from the location server 122. Nevertheless, the endpoint 108 need not be mobile and may instead remain at a fixed location. In one implementation, the location module 124 may issue location requests to the location server 122. The location module 124 may coordinate maintenance of a central repository of endpoint location information in the SO system 104. Alternatively or additionally, the location module 124 may forward endpoint locations to the media server 106, such as in response to the media business logic 118 invoking an application programming interface (API) to request endpoint location from the SO system 104.

As will be described in more detail below, the endpoint locations received via the location updates may help the delivery system 100 determine when to interrupt a primary media stream that the media server 106 is delivering to the endpoint 108. The delivery system 100 may further consider the endpoint characteristics and subscription information when determining when to interrupt.

The CMS 102 includes availability logic 128 and transcoding logic 148. The availability logic 128 may monitor for the availability of secondary media. In that regard, the availability logic 128 may implement a media request interface 130 and a media reception interface 132. As examples, the media request interface 130 may communicate Real Simple Syndication (RSS) subscription requests to external media servers, communicate specific media requests (e.g., HTTP requests) to external media servers, or communicate other requests using other protocols for available media to external systems.

The availability logic 128 receives the available secondary media over the media reception interface 132 and provides the secondary media to streaming media logic 134 in the media server 106. The transcoding logic 148 may convert the media from its received format (e.g., AVI or WAV) to any desired or specified format (e.g., MP4 or MP3) for the media server 106. In addition, when secondary media becomes available, the availability logic 128 communicates a media notification message on the notification interface 136 to the notification module 138 in the SO system 104. The media notification message may include a media type identifier (e.g., a traffic report or weather report identifier), timestamp, relevant location (e.g., the Melbourne Australia area), or other media characteristic information.

In turn, the notification module 138 may communicate an interrupt message to the interrupt controller 140 in the media server 106. The SO system 104 may filter interrupts. For example, the SO system 104 may determine that the endpoint 108 should be made aware of the newly available media based on a media characteristic for the secondary media and endpoint characteristics for the endpoint. The notification module 138 may then generate the interrupt notification when the endpoint characteristic matches the media characteristic.

As examples, the endpoint characteristic may be the current endpoint location, subscription characteristics, or other characteristics. In more detail, when, for example, the endpoint 108 is in a location where the secondary media is relevant (e.g., a location where bad weather alerts are relevant) and the endpoint 108 has subscribed to weather alerts, the SO system 104 may generate the interrupt message to the media server 106. As will be explained in more detail below, interrupt filtering may be performed at the SO system 104, the media server 106, the endpoint 108, or other locations.

The delivery system 100 streams delivery of a primary media stream 144 to the endpoint 108. The delivery system 100 further supports interrupting the primary media stream 144 and delivering instead a secondary media stream 146. When the secondary media stream 146 finishes, the delivery system 100 then resumes playback of the primary media stream 144.

Figure 2:
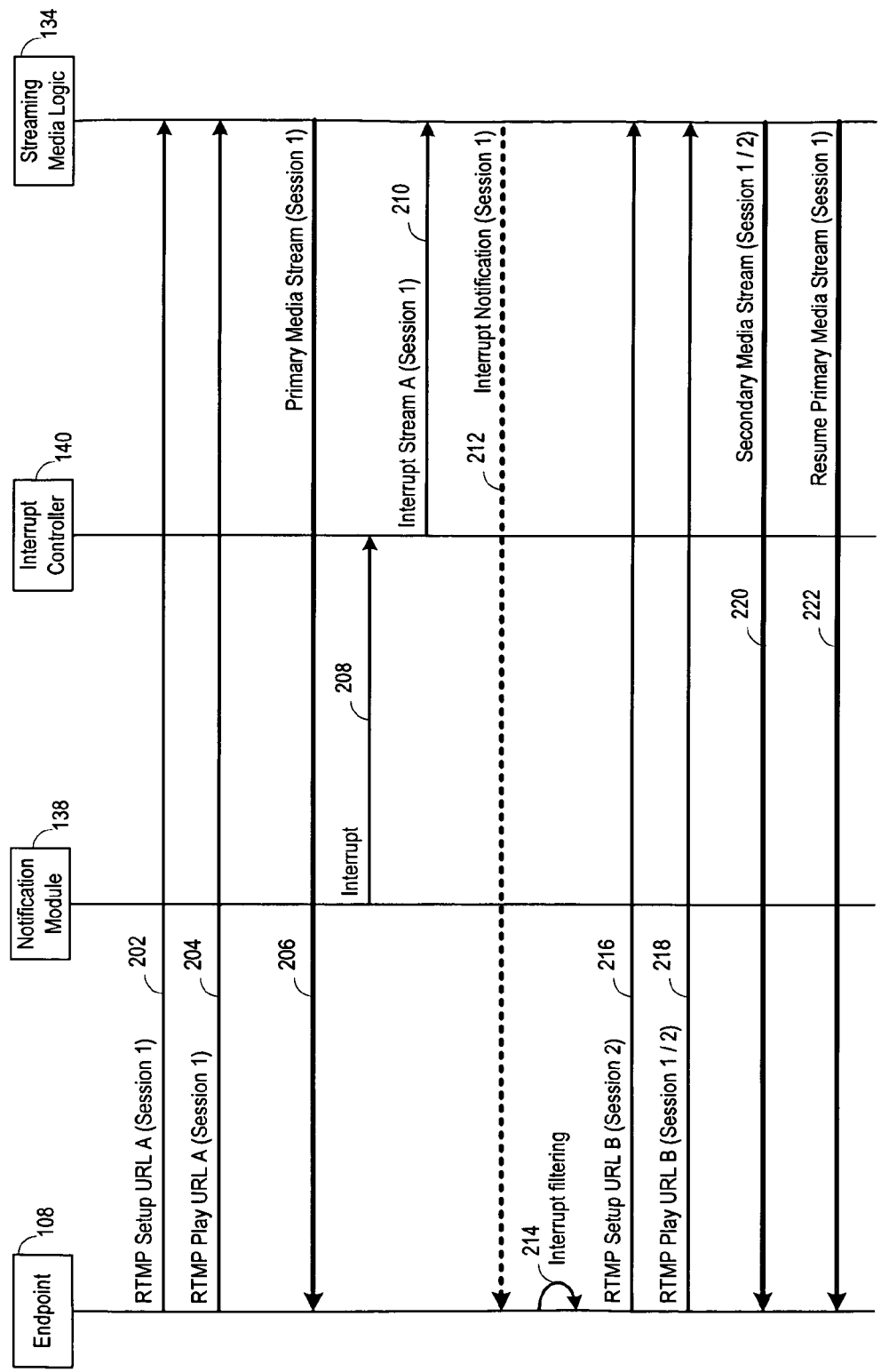
FIG. 2 shows messaging flow in a media delivery system.

A detailed example of the message flow supporting interruption and resumption of the media streams is shown in FIG. 2. FIG. 2 presents an example in which the media server 106 sends interrupt notifications to the endpoint 108. The client logic in the endpoint 108 performs interrupt filtering and responds with an interruption request to the media server 106.

Initially, the client logic in the endpoint 108 establishes a connection to the media server 106. As noted above, the endpoint 108 may perform a username/password or MSISDN based authentication and authorization procedure. As part of the connection process, the media server 106 may request the current subscriber location from the SO system 104 and deliver the current subscriber location to the endpoint 108. Once authorized, the client logic connects to the client front end 112 and issues a session setup request (202). As one example, the session setup request may be a Real Time Media Protocol Setup (RTMP) request, but other protocols may be used. Once the media server 106 has established the session, the client logic issues a media playback request (204). The media playback request may specify a Uniform Resource Locator (URL), or other media indicia, that identifies the media that the media server 106 should begin to stream to the client 108 as the primary media stream. For example, the media indicia may include a playlist name, or a specific song identifier for a song on a playlist. In response to the media playback request, the streaming media logic 134 initiates delivery of the primary media stream to the endpoint 108 (206).

The CMS 102 regularly checks for new media to become available. When, for example, a new traffic report for the Melbourne Australia area arrives, the CMS 102 communicates a media notification message to the notification module 138. The media notification message may include media characteristics, such as relevant geographical location identifiers (e.g., Melbourne Australia) and content identifiers (e.g., a traffic report identifier). The media characteristics may specify multiple relevant media characteristics, including multiple relevant location identifiers and multiple application content identifiers.

The notification module 138 communicates an interrupt notification to the interrupt controller 140 in the media server 106 (208). In turn, the interrupt controller 140 provides an interrupt notification to the streaming media logic 134 (210). The streaming media logic 134 communicates the interrupt notification to the endpoint 108.

As shown in FIG. 2, the streaming media logic 134 sends the interrupt notification to the endpoint 108 in the same session used for the primary media stream, e.g., interleaved with the primary media stream (212). One benefit is that no extra resources are expended to setup a separate communication channel to the endpoint 108. Furthermore, the streaming media logic 134 may perform a broadcast of the interrupt notification. To that end, the streaming media logic 134 communicates the interrupt notification, including the media characteristics, to multiple endpoints. For example, the streaming media logic 134 may communicate the interrupt notification to each subscriber currently connected to the media server 106 and receiving a media stream from the media server 106.

The endpoint 108 performs local filtering on the interrupt notification (214). In that regard, the endpoint 108 may obtain the media characteristics for the newly available media from the interrupt notification, and obtain endpoint characteristics about the endpoint 108, such as current location, media preferences, and other characteristics. The client logic in the endpoint 108 matches one or more of the media characteristics against the endpoint characteristics. As one example, the client logic may determine whether the current location of the endpoint 108 matches the geographical location identifier provided in the interrupt notification for the newly available media. As another example, the client logic may determine whether the media type of the newly available media matches a media preference (e.g., emergency alerts) set by the endpoint 108. The client logic may check for matches on any combination of characteristics (e.g., location by itself, or media content, location, and time of day in combination).

If there is a match, the client logic in the endpoint 108 may select between multiple delivery options for receiving the newly available media from the media server 106. As examples, the client logic may consult a preference profile stored in the endpoint 108 or may request user input for a delivery option input. One example of a delivery option is a concurrency option. The concurrency option specifies whether the newly available media is delivered with the primary media stream, or whether the primary media stream is interrupted to deliver the newly available media stream in place of the primary media stream.

When the delivery option is concurrent delivery, the client logic issues a new session setup request (216), followed by a media playback request (218) for the newly available media in its own session. The streaming media logic 134 responds by sending a secondary media stream for the newly available media to the endpoint 108 in a second session (220). In conjunction with concurrent streaming, the media server 106 may dynamically allocate bandwidth to the endpoint 108. Thus, in response to the concurrent delivery option, the media server 106 may allocate additional bandwidth, partition existing bandwidth between sessions (e.g., the session for the primary media stream, and a session for the secondary media stream), or take other bandwidth allocation actions. One benefit of concurrent delivery is that the subscriber can experience the newly available media in the background without interrupting the primary media stream. When the media are of different types (e.g., music as the primary media stream, and an emergency altering graphic or video as the secondary media stream), both types of media may stream to the endpoint 108 without masking or interfering with one another.

When the delivery option is interrupted delivery, the client logic issues a media playback request for the newly available media (218). The media playback request may specify that the newly available media should stream to the endpoint 108 using the same session as the primary media stream. The streaming media logic 134 responds by interrupting delivery of the primary media stream, and initiating delivery of a secondary media stream for the newly available media to the endpoint 108 (220). The media server 106 maintains the interruption point of the primary media stream for future reference. However, in other implementations, the client logic may request the interruption point from the media server 106, or locally maintain the streaming length of the primary media stream received so far. When the secondary media stream has finished (e.g., when it reaches its normal endpoint, or when it is canceled by the endpoint 108 or other entity), the media server 106 resumes playback of the primary media stream from the interruption point (222). In other implementations, the client logic, rather than the media server 106, may determine that the end of the secondary media stream has been reached, and request resumption of the primary media stream, specifying the interruption point.

The implementation described in FIG. 1 and FIG. 2 provides a less complex yet very scalable architecture. In particular, the implementation described in FIG. 1 and FIG. 2 includes broadcasting of interrupts to multiple connected endpoints (e.g., all connected endpoints may receive each interrupt notification). As a result, the streaming media logic 134 need not maintain or manage presence information for a potentially great number of endpoints. Furthermore, each endpoint performs local interrupt filtering, which provides efficient distributed processing for the interrupts, and reduces the complexity of the notification module 138. With this approach, the notification module 138 need not determine, for every media notification message that arrives from the CMS 102 and for every endpoint 108, which endpoints should actually receive an interrupt notification.

Figure 3:
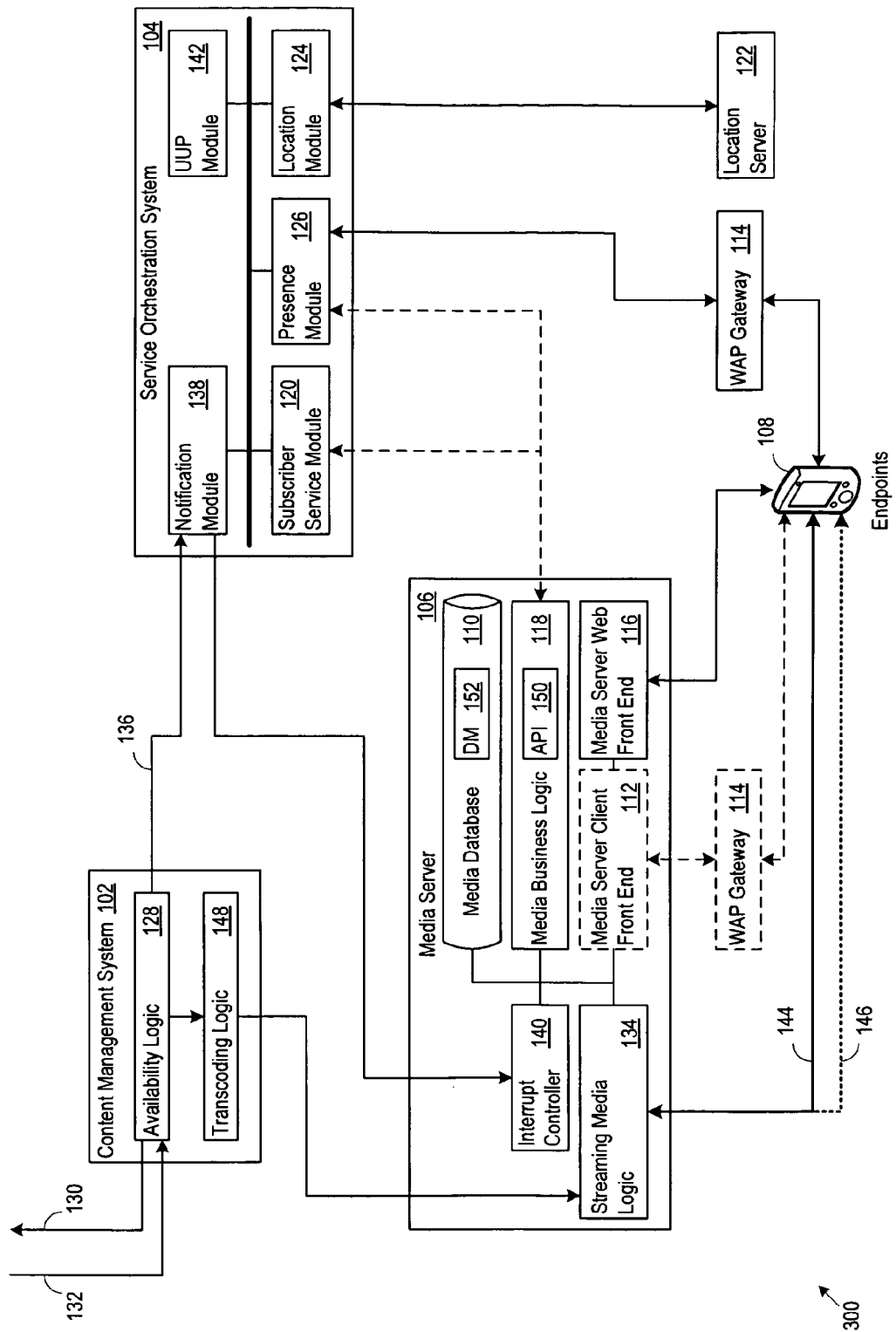
FIG. 3 shows a media delivery system.

FIG. 3 shows an alternative implementation of a media system 300. The media server 106 may be configured as shown in FIG. 1, but FIG. 3 also shows that the client logic in the endpoint 108 may optionally communicate directly with presence module 126 in the SO system 104 through the WAP gateway 114. Thus, in addition to, or as an alternative to the client front end 112, the client logic may communicate directly with the SO system 104. The presence module 126 performs an MSISDN access check and determines and maintains records of which subscribers are connected, their communication addresses (e.g., their Internet Protocol (IP) addresses), the radio access type (e.g., 2G or 3G access) and the network provider (e.g., SGSN-IP), and determines whether or not the channel to the endpoint 108 support streaming, and if so, at what quality. With this information, the SO system 104 may determine that access to the media server 106 is or is not permitted to the endpoint 108. The systems shown in FIG. 1 and FIG. 5 (described below) may also determine whether any particular endpoint 108 is permitted to connect to the media server 106. The SO system 104 coordinates playback of media to the endpoint 108 through communication with the media server 106, and responsive to the client logic a the endpoint 108.

Figure 4:
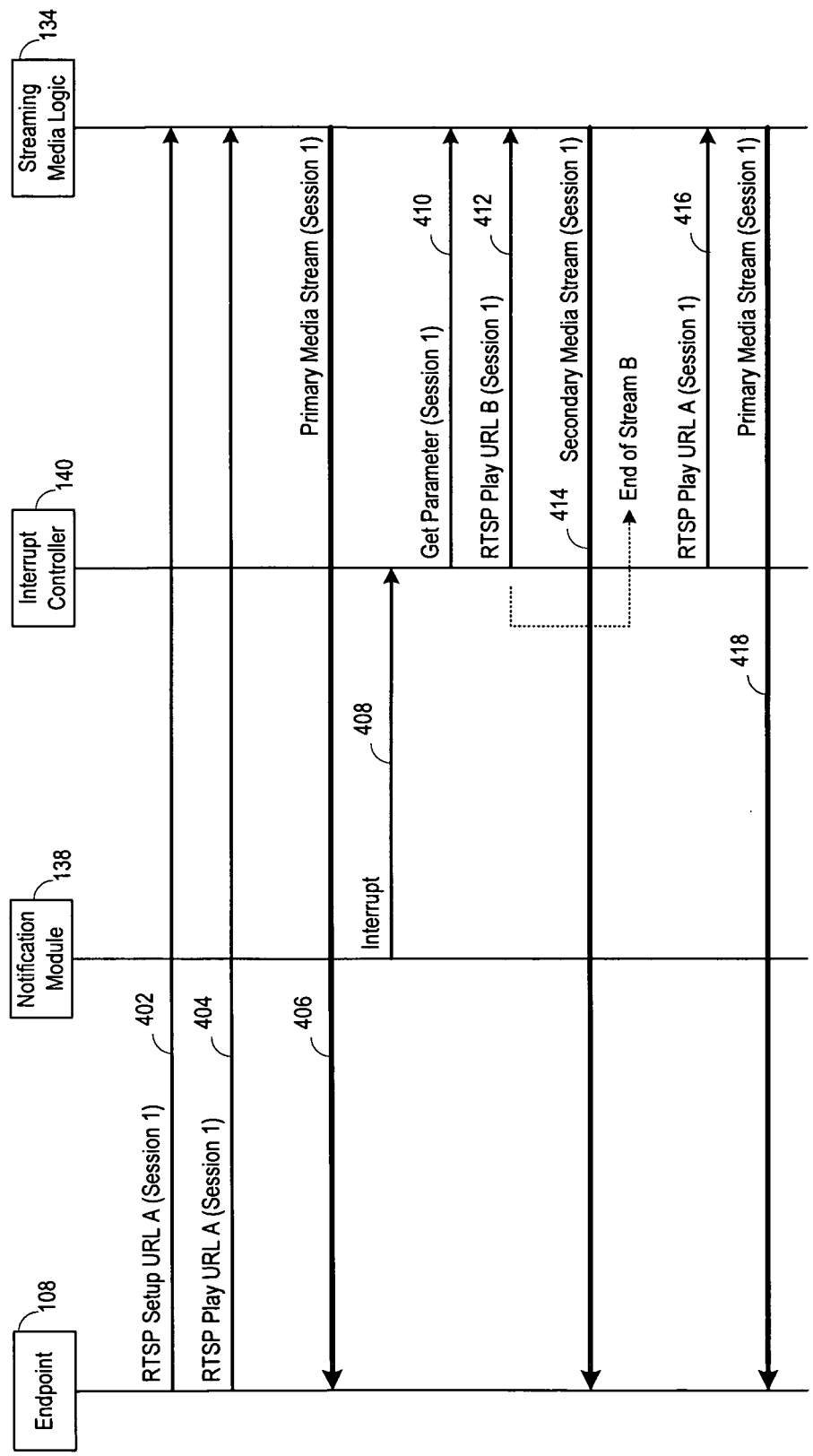
FIG. 4 shows messaging flow in a media delivery system.

FIG. 4 shows a second example of message flow (e.g., through the system 300) for coordinating streaming media delivery to the endpoint 108. The endpoint 108 establishes a connection to the system 300. For example, the endpoint 108 may perform an MSISDN based authentication and authorization procedure coordinated by the presence module 126. Once authorized, the client logic issues a session setup request to the media server 106 (402). As one example, the session setup request may be a Real Time Streaming Protocol (RTSP) Setup request. Once the media server 106 has established the session, the client logic issues a media playback request (404). The media playback request may specify a Uniform Resource Locator (URL), or other media indicia, that identifies the media that the media server 106 should begin to stream to the client 108 as the primary media stream. In response to the media playback request, the streaming media logic 134 initiates delivery of the primary media stream to the endpoint 108 (406).

When new media is available, the notification module 138 communicates an interrupt notification to the interrupt controller 140 in the media server 106 (408). The interrupt notification may include the Internet Protocol (IP) address of the endpoint 108, or other subscriber connection information obtained from the SO system 104 via the presence module 126, subscription service module 120, or other subsystem. In contrast to the example shown in FIG. 2, the interrupt controller 140 issues a parameter request to the streaming media logic 134, specifying, for example, the IP address of the endpoint 108 (410). The streaming media logic 134 returns to the interrupt controller 140, for the requested IP Address, a streaming length and session identifier for the primary media stream. The streaming length represents the amount of the primary media stream delivered so far to the endpoint 108 over the session identified by the session identifier.

The streaming length gives the interruption point for the primary media stream. The interrupt controller 140 emulates an endpoint 108 playback request by following the parameter request with a media playback request for the secondary media stream that conveys the newly available media (412). The streaming media logic 134 responds by switching the stream from the primary media to the newly available media. In other words, the streaming media logic 134 stops sending media data for the primary media stream, and instead begins sending the secondary media stream in place of the primary media stream.

The interrupt controller 140 monitors delivery of the secondary media stream to the endpoint 108. When the secondary media stream has finished, the interrupt controller 140 issues a new media playback request (416). The new request directs the streaming media logic 134 to begin playback of the primary media stream, but at the interruption point. Accordingly, the streaming media logic 134 resumes delivery of the primary media stream from the interruption point, ensuring that the endpoint 108 receives the complete media object from start to finish.

The interruption and resumption technique shown in FIG. 4 is particularly efficient. The streaming media logic 134 switches to the secondary media stream within the same RTSP session. As a result, no additional overhead is incurred to setup a new session. In the example shown in FIG. 4, the streaming media logic 134 supports parameter requests and the override and substitution of a currently playing media stream (e.g., specified by a particular URL) with another media stream. In other implementations, however, such functionality need not be included in the streaming media logic. An alternative is described below in connection with FIGS. 5-7.

Figure 5:
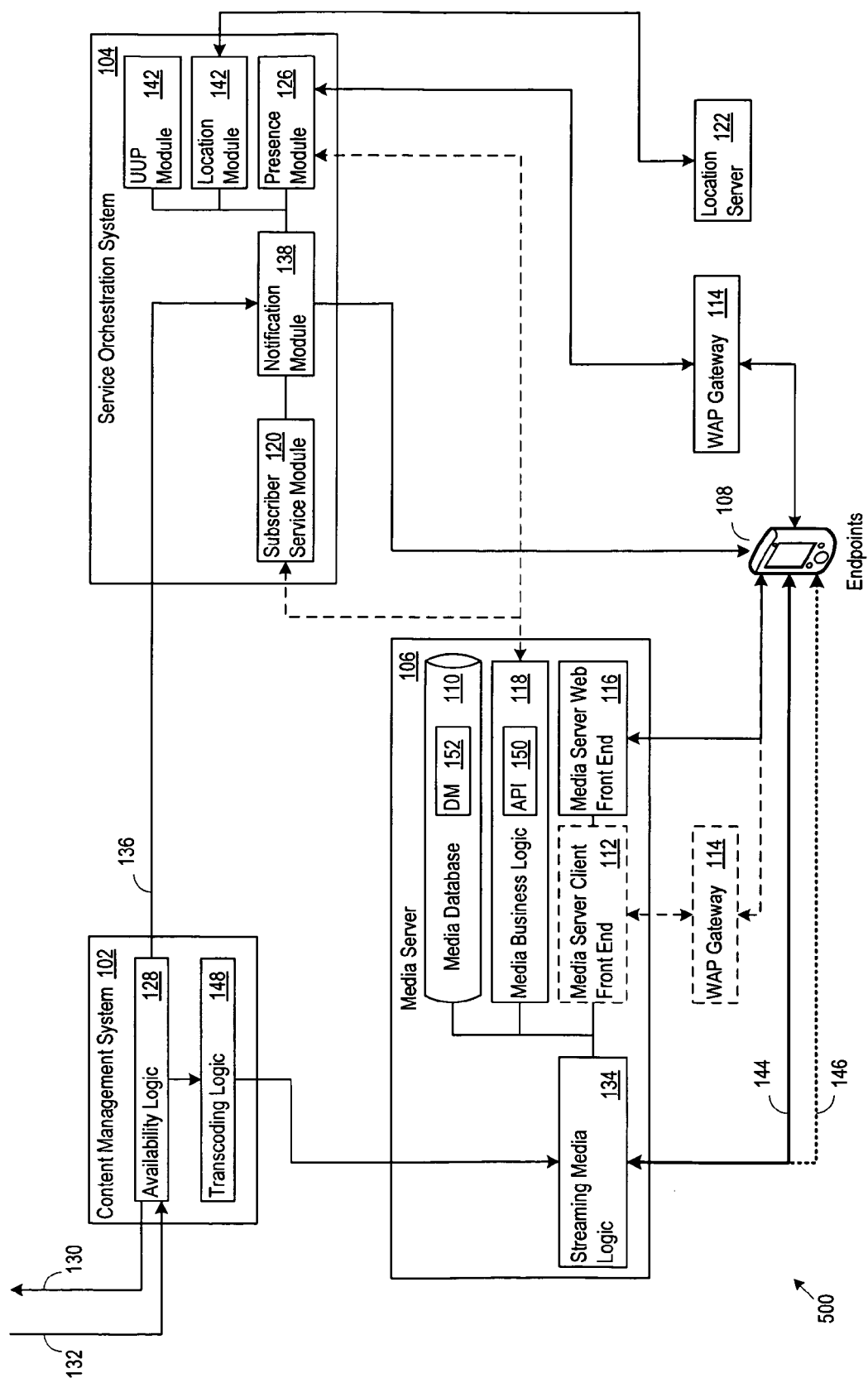
FIG. 5 shows a media delivery system.
Figure 6:
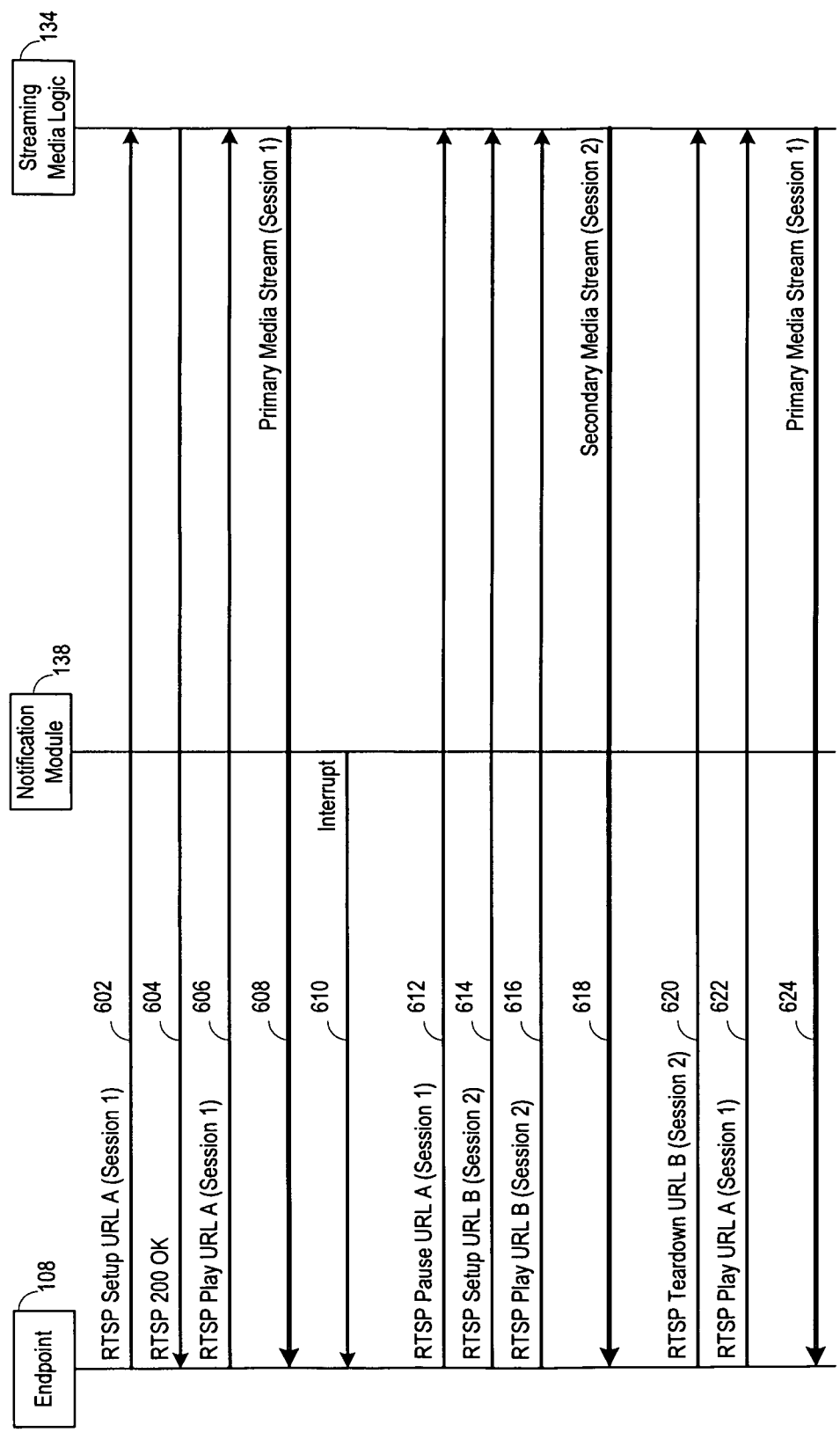
FIG. 6 shows messaging flow in a media delivery system.

FIG. 5 shows a media system 500. In particular, the notification module 138 interacts with the endpoint 108, rather than sending interruption notifications through the media server 106. FIG. 6 shows associated message flow and may be implemented when the streaming media logic 134 does not support parameter request messages. Once authorized, the client logic issues a session setup request to the media server 106 (602). The streaming media logic issues an acknowledgement message to the endpoint 108 (604). The acknowledgement message may include the session parameters, such as a session identifier and other session parameters. Once the media server 106 has established the session, the client logic issues a media playback request (606). In response to the media playback request, the streaming media logic 134 initiates delivery of the primary media stream to the endpoint 108 as Session 1 (608).

When new media is available, the notification module 138 communicates an interrupt notification to the endpoint 108 (610). In the example shown in FIG. 6, the streaming media logic supports the RTSP Pause/Play methods. Accordingly, the endpoint 108, communicates a media pause message for Session 1 to the streaming media logic 134 (612), thereby interrupting delivery of the primary media stream. The endpoint 108 follows with a media setup message (614) to establish a new Session (Session 2) for the secondary media stream and a media play message (616) to direct the streaming media logic 134 to initiate delivery of the secondary media stream (618).

The endpoint 108 monitors for the secondary media stream to finish. When the secondary media stream is complete, the endpoint 108 communicates a session teardown message for the new Session 2 to the streaming media logic 134 (620). In addition, the endpoint 108 also communicates a media play message to the streaming media logic 134 (622). The media play message specifies the session identifier obtained from the acknowledgement message (604). As a result, the streaming media logic 134 resumes playback of the primary media stream from the pause point over the Session 1 channel (624).

Figure 7:
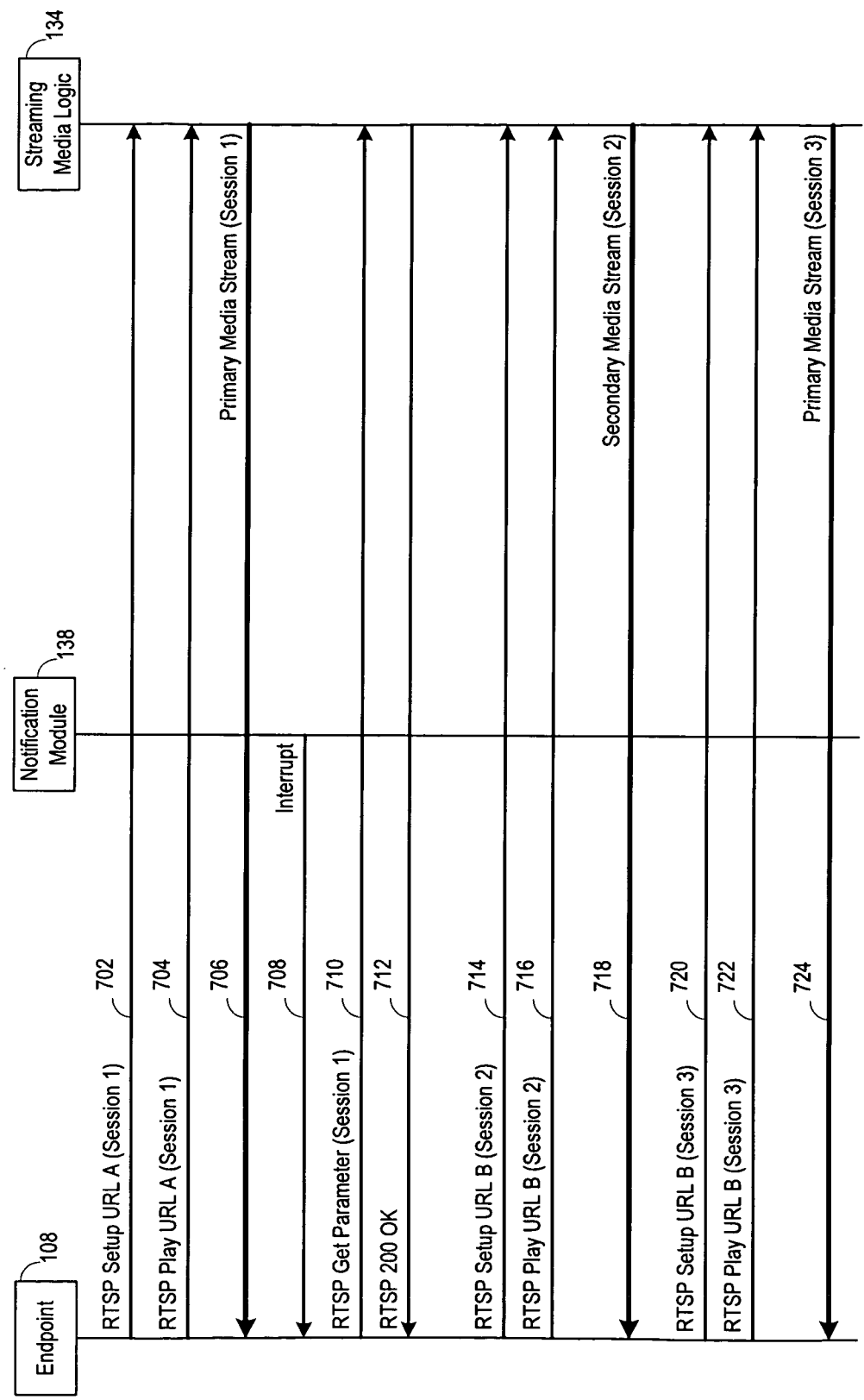
FIG. 7 shows messaging flow in a media delivery system.

FIG. 7 shows an alternate example for streaming media logic 134 that does not support the RTSP Pause method or multiple open sessions. The client logic issues a session setup request to the media server 106 (e.g., through the web front end 116) (702). Once the media server 106 has established the session, the client logic issues a media playback request (704). In response to the media playback request, the streaming media logic 134 initiates delivery of the primary media stream to the endpoint 108 as Session 1 (706).

When new media is available, the notification module 138 communicates an interrupt notification to the endpoint 108 (708). Because in this example the streaming media logic 134 does not support the Pause method, the endpoint 108 communicates a parameter request message for Session 1 to the streaming media logic 134 (710). In response, the streaming media logic 134 returns the streaming length to the endpoint 108 in the acknowledgement message (712). The streaming length represents the amount of the primary media stream delivered so far to the endpoint 108.

The endpoint 108 next issues a session setup message to the streaming media logic 134 (714). The streaming media logic 134 responsively establishes a new session, Session 2, while closing Session 1 and interrupting delivery of the primary media stream. The endpoint 108 then issues a media play message to the streaming media logic 134 (716). The streaming media logic 134 responds by initiating delivery of the secondary media stream to the endpoint 108 over Session 2 (718).

The endpoint 108 monitors the secondary media stream for completion. When finished, the endpoint 108 issues a new session setup message to the streaming media logic 134 (720). The streaming media logic 134 responsively establishes a new session, Session 3, while closing Session 2. The endpoint 108 then communicates a media play message to the streaming media logic 134 (722). The media play message specifies the streaming length (i.e., the interruption point) to the streaming media logic 134. Accordingly, the streaming media logic 134 resumes playback of the primary media stream from the interruption point over Session 3.

Figure 8:
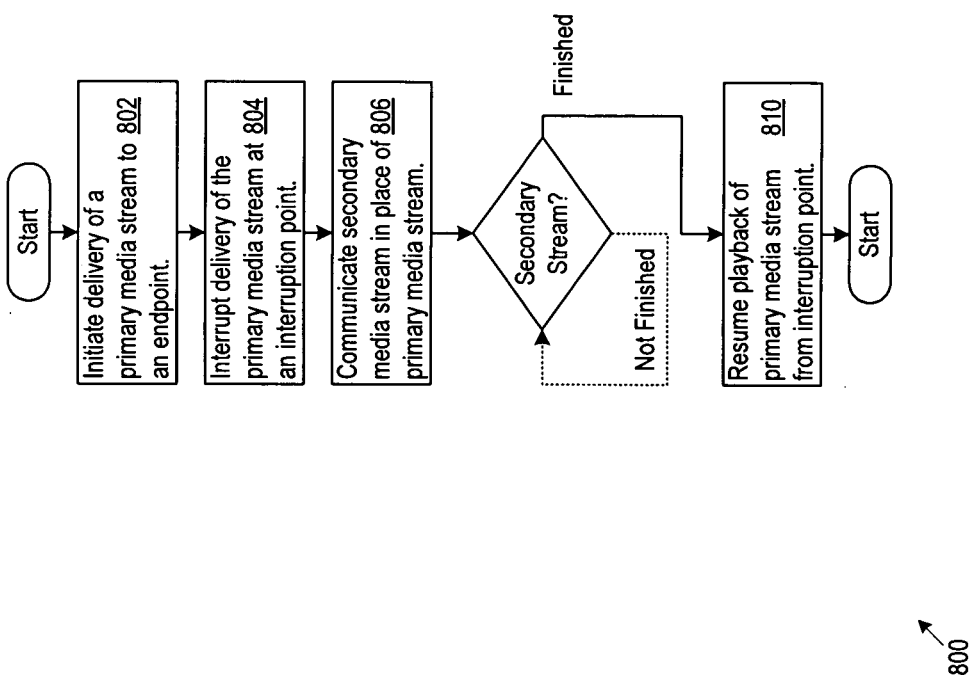
FIG. 8 shows processing flow for media delivery.

FIG. 8 shows a flow diagram 800 for media delivery. A media system initiates delivery of a primary media stream to an endpoint (802). The media system also interrupts delivery of the primary media stream at an interruption point, for example when new media is available (804). The media system communicates a secondary media stream for the newly available media in place of the primary media stream (806).

The media system determines when the secondary media stream has finished. The secondary media stream may finish when it has been delivered in its entirety, when it is cancelled (e.g., by the endpoint), when it is overridden by the system, or under other conditions that end the secondary media stream. When the secondary media stream has finished, the media system resumes playback of the primary media stream from the interruption point (810).

Figure 9:
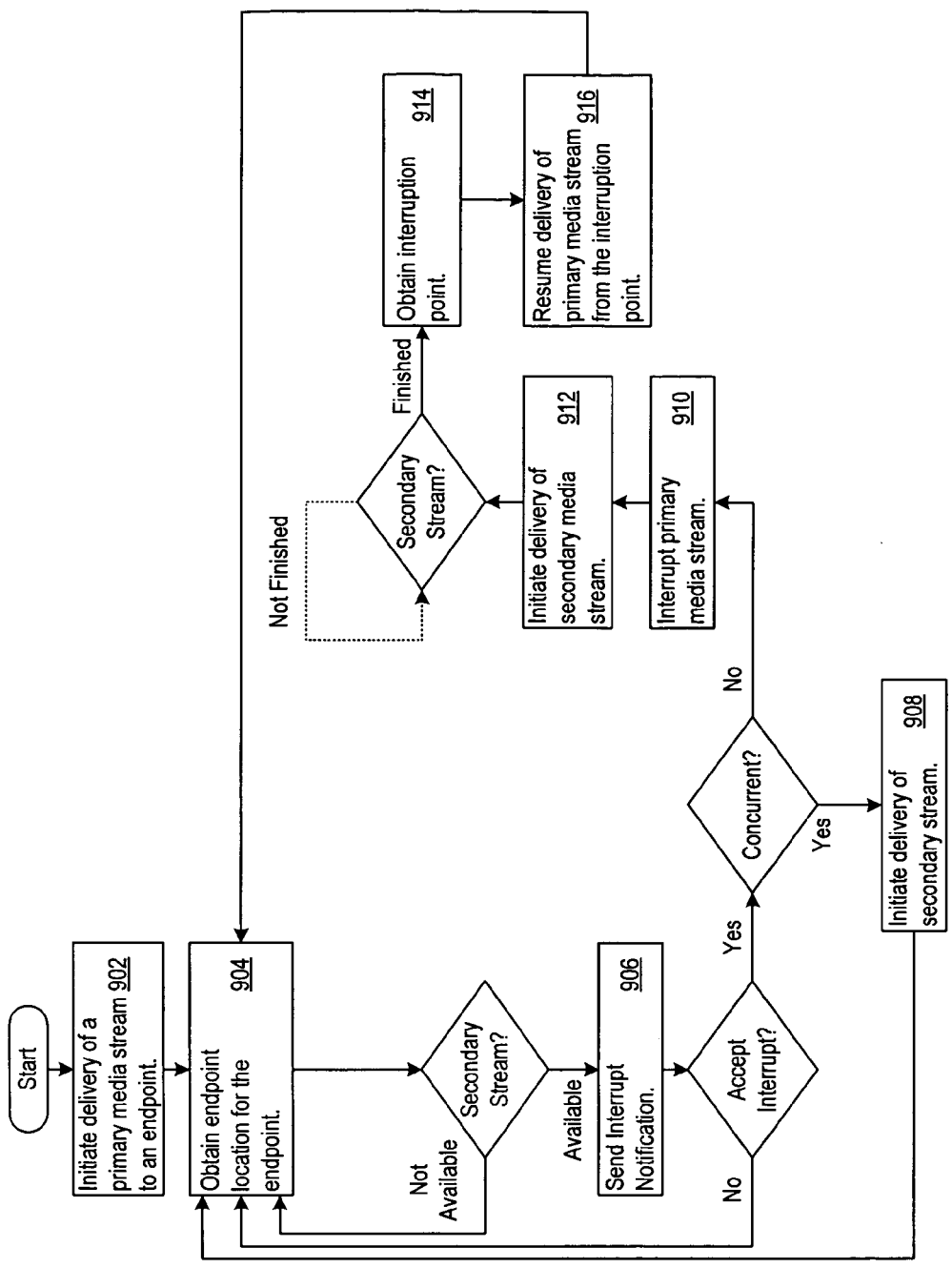
FIG. 9 shows processing flow for media delivery.

FIG. 9 shows an additional flow diagram 900 for media delivery. The media server 106 initiates delivery of a primary media stream to the endpoint 108 (902). At any time (e.g., at subscriber logon, or during periodic updating intervals), the SO system 104 or the endpoint 108, through the SO system 104 and the location module 124 may obtain or update the endpoint location (904). When a secondary media stream is available, the delivery system 100 sends an interrupt notification to the endpoint 108. The endpoint 108 or the notification module 138 filters the interrupt notification based on subscriber characteristics (e.g., subscriber location and content preferences) and media characteristics (e.g., relevant location and content type) and determines whether to accept the interrupt.

When the endpoint 108 accepts the interrupt, the client logic may specify whether the secondary media stream should be delivered concurrently. If so, the streaming media logic 134 initiates delivery of the secondary media stream without interrupting the primary media stream (908). Otherwise, the streaming media logic 134 interrupts delivery of the primary media stream at an interruption point (910) and initiates delivery of a secondary media stream (912). When the secondary media stream finishes, the streaming media logic 134 obtains the interruption point for the primary media stream (914) and resumes delivery of the primary media stream to the endpoint from the interruption point (916).

Figure 10:
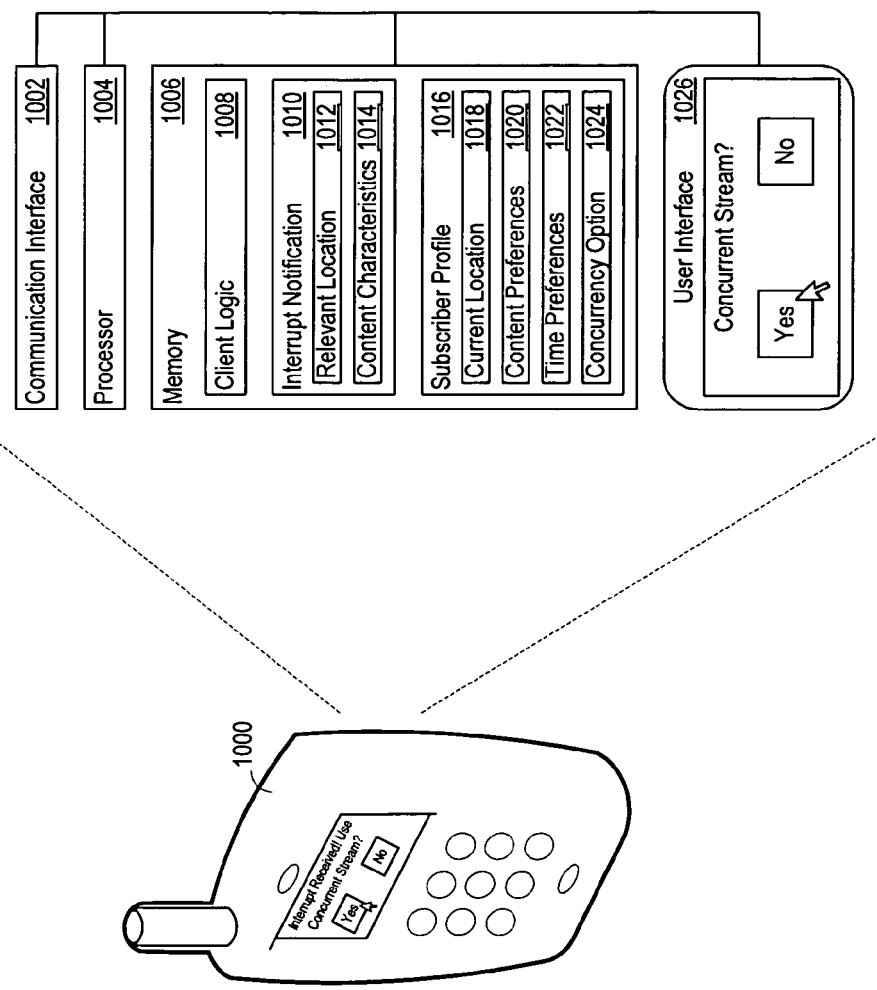
FIG. 10 shows an endpoint with client logic.

FIG. 10 shows an example of an endpoint 1000 that supports media stream interruption and resumption in an implementation where the interruption filtering logic resides on the endpoint 108. The endpoint 1000 includes a communication interface 1002, a processor 1004, and a memory 1006. The communication interface 1002 may be a wireline or wireless interface, and the transmitted signals may adhere to a diverse array of formats, modulations, frequency channels, bit rates, and encodings, such as those specified by WiFi, Bluetooth, Global System for Mobile communications (GSM), Time Division Multiple Access (TDMA), Frequency Division Multiple Access (FDMA), Evolution-Data Optimized (EVDO), Code Division Multiple Access (CDMA), 3rd Generation Partnership Project (3GPP or 3GPP2), or other wireless or wireline protocols.

The processor 1004 executes the client logic 1008 to carry out the streaming interruption and resumption processing explained above. FIG. 10 shows that the memory 1006 provides storage for interrupt notifications 1010 and subscriber profiles 1016. The interrupt notifications 1010 may be received over the communication interface 1002 and may include media characteristics for supplemental media that is available. Such media characteristics include the relevant location 1012 (e.g., Melbourne Australia) and the content characteristics 1014 (e.g., the media type, time, appropriate age level, duration, or other characteristics).

The subscriber profiles 1016 include characteristics for the endpoint 1000. The endpoint 1000 may include multiple subscriber profiles 1016, any one or more of which may be selected by subscriber input as the currently active subscriber profile. The subscriber profile 1016 includes endpoint characteristics. The characteristics shown in FIG. 10 include the endpoint location 1018, content preferences 1020, time preferences 1022, and concurrency preferences 1024. Table 1 gives examples of the endpoint characteristics.

TABLE 1

| Endpoint Characteristic | Examples |
| --- | --- |
| Current Location | Latitude: 37 degrees 47 seconds South<br>Longitude: 144 degrees 58 minutes East<br>Base Station Identifier and Cell Identifier for the cell in which the endpoint currently exists and the base station in communication with the endpoint.<br>Country/City/State/County/Region/Province/City/Town Identifiers<br>Road/Mile Marker Identifiers |
| Content Preferences | Weather alerts: Yes<br>Traffic updates: Yes<br>Emergency alerts: No |
| Time Preferences | Allow interrupts from 7 am to 10 am and from 5 pm to 8 pm |
| Concurrency Option | Interrupt |

The concurrency preferences 1024 may specify whether the endpoint 1000 prefers to receive newly available content at the same time as primary content, or whether the endpoint 1000 prefers the primary content to be interrupted. The endpoint 1000 may additionally or alternatively present configuration options on the user interface 1026. The example in FIG. 10 shows the client logic 1008 requesting subscriber input via the user interface 1026 to select whether newly available content should be delivered in a concurrent stream. As another example, the client logic 1006 may ask the subscriber, via the user interface 1026, to verify whether or not any particular interrupt notification should be accepted so that the newly available content is delivered to the endpoint 1006.

Figure 11:
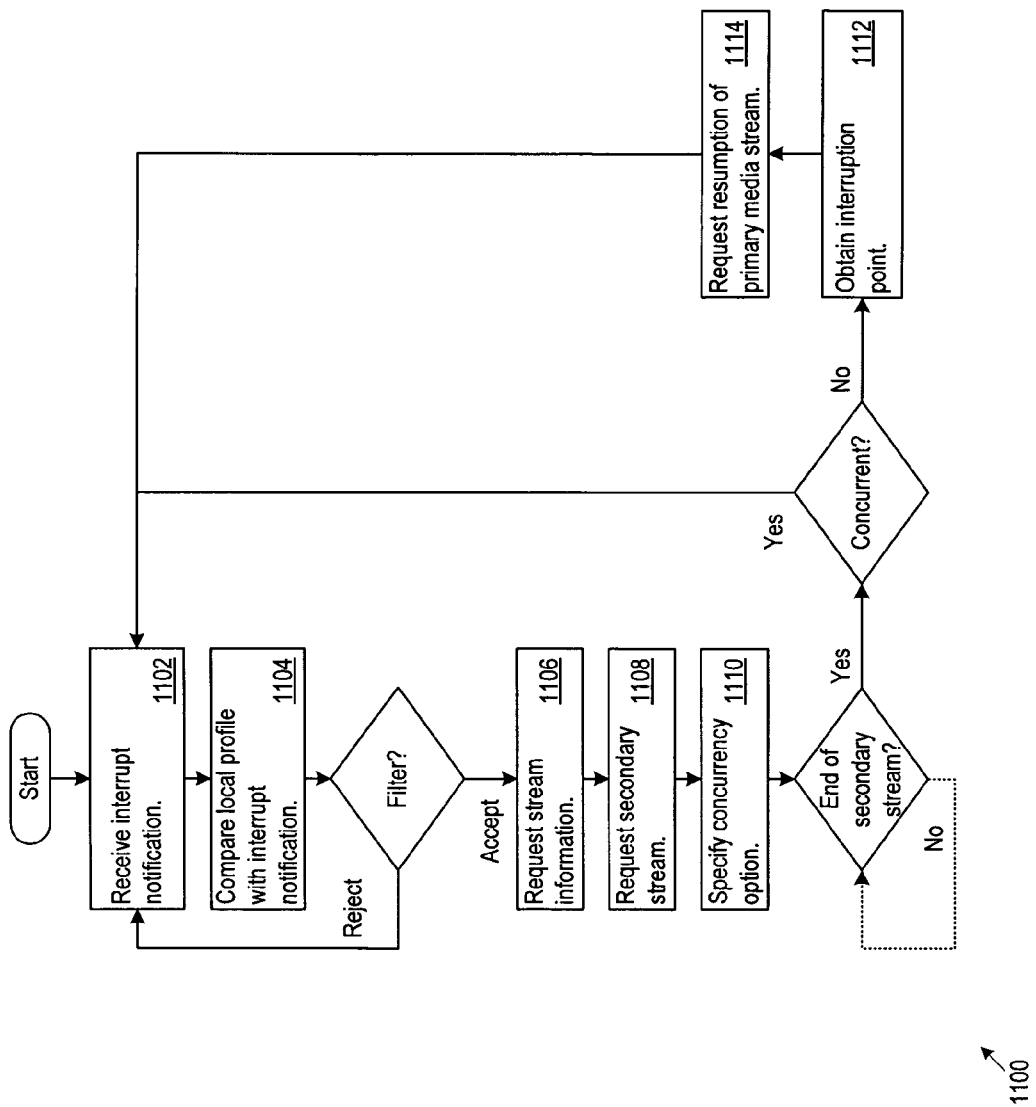
FIG. 11 shows processing flow for client logic.

FIG. 11 shows an example of processing flow for the client logic 1008 which may be present in the endpoint 108 or in another system. The client logic 1008 receives an interrupt notification (1102) that may include media characteristics for newly available media. Such media characteristics may include relevant location, content type, content length, or other media characteristics.

The client logic 1008 compares endpoint characteristics with the media characteristics (1104). A locally stored profile may hold the endpoint characteristics. Examples of endpoint characteristics include endpoint location, content type preferences, content length preferences, content delivery time or date preferences, and other types of endpoint characteristics.

If the client logic 1008 finds a match and decides to accept the interrupt, the client logic 1008 may request any stream information (1106) useful for resuming the primary media stream from the interruption point. However, in other implementations, the client logic 1008 may forgo the request for stream information and instead rely on the media server 106 to track and maintain the current streaming length so that playback of the primary media stream may resume from the interruption point. Examples of stream information include the session identifier, current streaming length, connection type associated with the primary media stream. The client logic 1008 then requests delivery of the newly available media content (1108) and may specify a concurrency option (1110). The concurrency option may be included in the request for the newly available media content, and may direct the media systems to provide concurrent stream delivery or interrupted stream delivery.

When the secondary media stream has finished and the primary media stream was interrupted, the client logic 1008 may obtain the interruption point (1112), for example by retrieving the streaming length at the time the interruption of the primary media stream occurred. The client logic 1008 may then issue a media play request that specifies the interruption point (1114). As a result, the media systems resume delivery of the primary media stream from the point where the primary media stream was interrupted.

Figure 12:
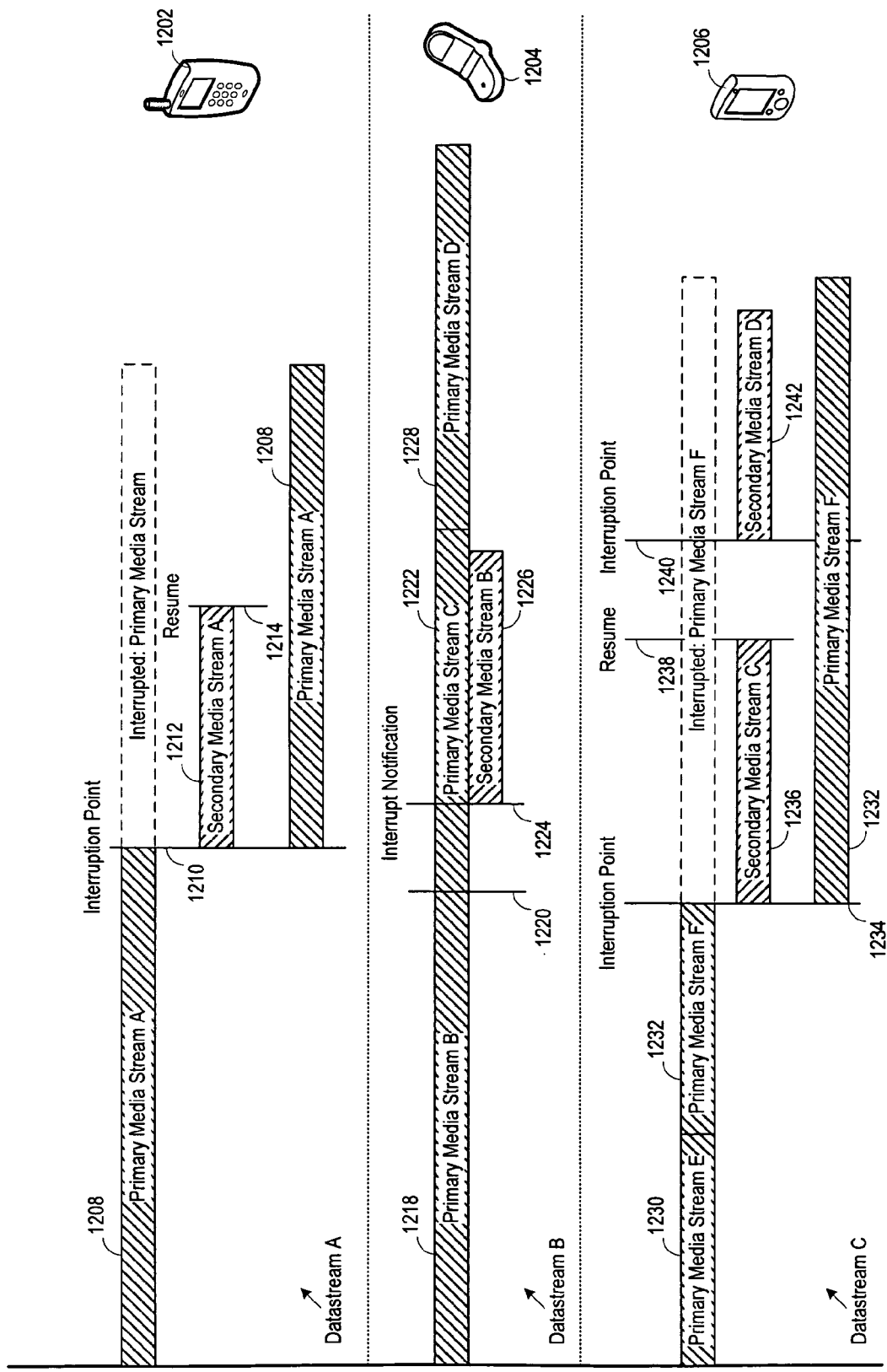
FIG. 12 shows streaming media delivery, interruption, and resumption.

FIG. 12 shows example datastreams A, B, and C generated when multiple endpoints interact with the delivery systems described above. The endpoints represented in FIG. 12 include a smart phone 1202 associated with datastream A, a cell phone 1204 associated with datastream B, and a PDA 1206 associated with datastream C. The smart phone 1202 initially receives the primary media stream A 1208. An interrupt arrives for a location and for content relevant to the smart phone 1202. As a result, the delivery systems interrupt streaming of the primary media stream A 1208 to the smart phone at the interruption point 1210.

Once interrupted, the delivery systems being streaming the secondary media stream A 1212 to the smart phone 1202. At the resumption point 1214, the secondary media stream 1212 has completed. Accordingly, the media delivery systems resume delivery of the primary media stream A 1208 from the interruption point 1210.

The cell phone 1204 initially receives the primary media stream B 1218. At point 1220, the primary media stream A 1218 finishes, and the delivery systems begin the streaming delivery of the next media object (e.g., the next song on a playlist) to the cell phone 1204 in the primary media stream C 1222. In addition, at notification point 1224, an interrupt notification arrives, conveying to the cell phone 1204 that relevant supplemental media, such as a traffic alert, is available.

The cell phone 1204 receives the supplemental media in a secondary media stream B 1226 and in a session concurrent with delivery of the primary media stream C 1222. The delivery systems may allocate bandwidth to the cell phone 1204 to accommodate the simultaneous delivery of the primary media stream C 1222 and the secondary media stream B 1226. For example, the delivery systems may add bandwidth to the connection supporting the cell phone 1204. As another example, the delivery systems may reduce the bandwidth of the session supporting the primary media stream C 1222 and reallocate that bandwidth to a new session supporting the secondary media stream B 1226. Once the secondary media stream B 1226 completes, the delivery systems may restore the prior bandwidth allocations (or make different allocations or no changes). The delivery systems continue to stream primary media to the cell phone, and the primary media stream D 1228 follows completion of the primary media stream C 1222.

The PDA 1206 initially receives the primary media stream E 1230. Once it finishes, the delivery system proceeds with the next media item, delivered to the PDA 1206 in the primary media stream F 1232. At the interruption point 1234, an interrupt notification is generated for a weather alert relevant to the current location of the PDA 1206. In this example, the delivery systems interrupt the primary media stream F 1232 at the interruption point 1234 and initiate delivery of the secondary media stream C 1236 that conveys the weather alert to the PDA 1206.

When the secondary media stream 1236 finishes at resumption point 1238, the delivery systems resume delivery of the primary media stream F 1232 from the interruption point 1234. A second interruption point 1240 is also shown. In this instance, the PDA 1206 requests concurrent delivery of the supplemental media. Accordingly, the delivery systems do not interrupt the primary media stream F 1232, but instead initiate delivery of the secondary media stream D 1242 with the primary media stream F 1232. As noted above, the delivery systems may dynamically adjust bandwidth for the connection to support the concurrent delivery to the PDA 1206.

Figure 13:
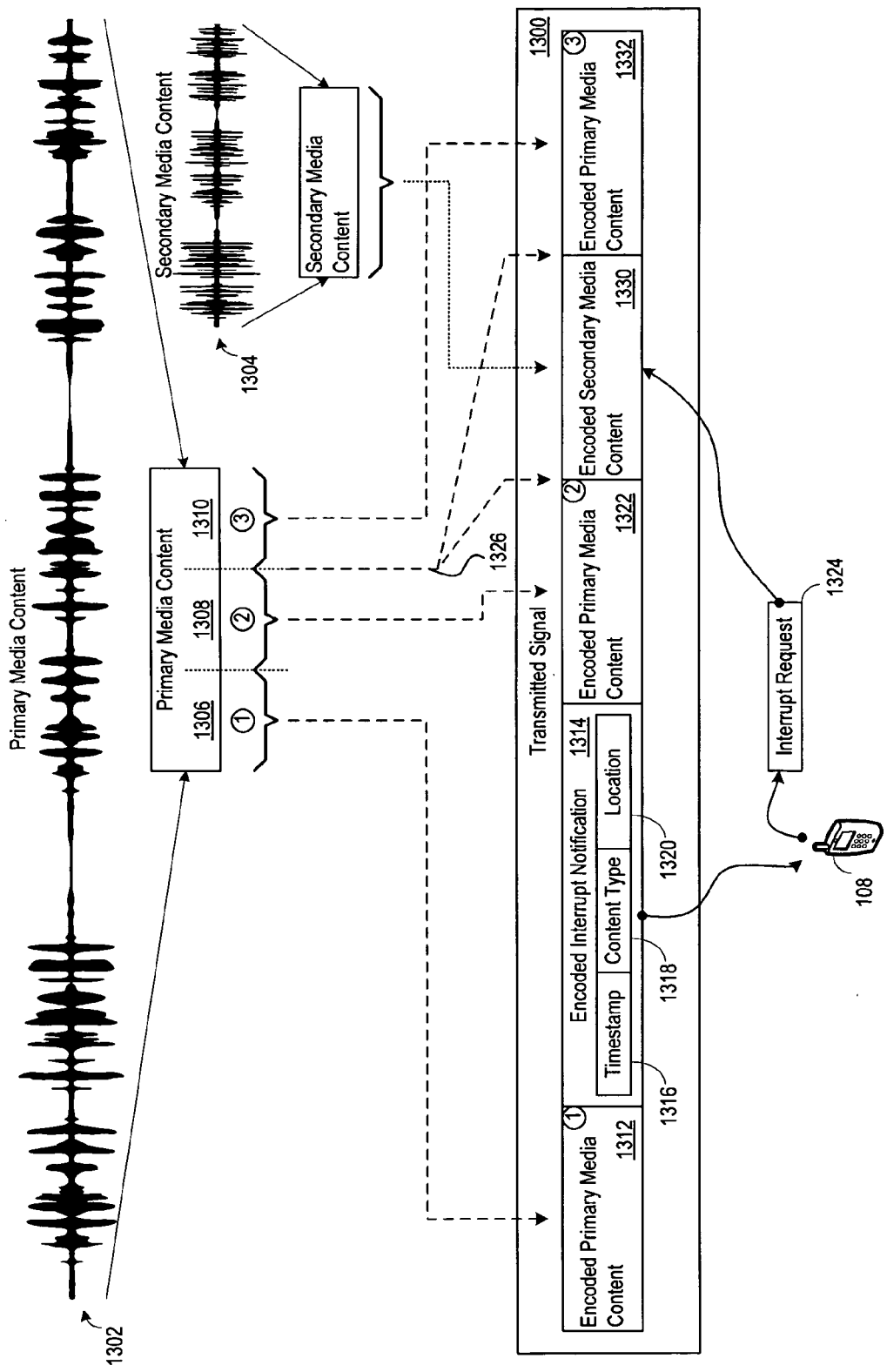
FIG. 13 shows a transmitted signal conveying data to an endpoint.

FIG. 13 shows a transmitted signal 1300 communicated from the media server 106 to the endpoint 108. The transmitted signal 1300 conveys primary media content 1302 and secondary media content 1304 to the endpoint 108. As described in more detail below, the transmitted signal 1300 also communicates interrupt notifications to the endpoint 108 and supports interruption and resumption of the primary media stream to the endpoint 108.

FIG. 13 shows primary media content 1302 as a baseband audio signal (e.g., capturing the song "Is There Anybody Out There?"). The secondary media content 1304 is also shown as a baseband audio signal (e.g., a time domain waveform capturing "Warning—Traffic Accident on Melton Highway near Calder Freeway, Use Caution."). The baseband audio signals may be represented in WAV format, MP3 format, or any other form. The primary media content 1302 may have a corresponding playlist entry in a playlist setup by the endpoint 108 and stored in the delivery systems. For discussion purposes, the primary media content is shown segmented into a first section 1306, a second section 1308, and a third section 1310.

In the process of transmitting content to the endpoint, the delivery systems may generated encoded signals. For example, when the delivery systems initiate streaming of the primary media content 1302 to the endpoint 108, a transmitter may encode the baseband data using a Gaussian minimum shift keying (GMSK), Quadrature Phase Shift Keying (QPSK), or other encoding. The encoding may employ a finite number of distinct signals to represent digital data. For a QPSK modulation encoding, for example, the binary bitstream for the baseband data may be demultiplexed into two digital bitstreams representing in-phase and quadrature-phase bits, which are separately modulated onto different orthogonal basis functions (e.g., two sinusoids). The separately modulated sinusoids are added to obtain the QPSK encoded form of the baseband data and driven through an antenna to generate the transmitted signal 1300. The transmitted signal 1300 is not limited to any particular form or generation technique, however.

FIG. 13 shows that the transmitted signal 1300 initially includes a first data stream encoding the first section 1306 of the primary media content 1302 as the encoded primary media content 1312. When the CMS 102 finds that new media is available, such as the traffic alert represented in the secondary media content 1304, the CMS 102 communicates a media notification message to the SO system 104 or the media server 106. The media notification message may include a timestamp (e.g., including time and date of receipt of the secondary media), a content type (e.g., a traffic alert identifier), a relevant location (e.g., Melbourne Australia), or other media characteristics.

The media server 106 delivers a responsive interrupt notification to the endpoint 108 in the form of an encoded interrupt notification 1314. The encoded interrupt notification 1314 may include any or all of the media characteristics. Thus, the endpoint 108 receives the interrupt notification and the media characteristics, conveyed to the endpoint 108 as the encoded timestamp 1316, encoded content type 1318, and encoded location 1320.

The media server sends the encoded interrupt notification 1314 with the encoded primary media content 1312. For example, the encoded interrupt notification 1314 may be sent sequentially, in parallel, or interleaved in the same session used to communicate the primary media content to the endpoint 108. When the encoded interrupt notification 1314 has been sent, the media server continues sending the primary media content, as shown in FIG. 13 as a second data stream following the encoded interrupt notification 1314 and conveying the second section of the primary media content 1308 as the encoded primary media content 1322.

The endpoint 108 receives the encoded interrupt notification 1314, demodulates, decodes, and recovers the data in the transmitted signal 1300, including the encoded interrupt notification 1314. As described above, the endpoint 108 may process the interrupt notification 1314 and determine whether a match exists for the newly available media. If the endpoint 108 decides to receive the secondary media content 1304, the endpoint 108 transmits an interrupt request 1324 to the delivery systems.

After the delivery systems receive the interrupt request 1324, the media streaming logic 134 interrupts delivery of the primary media stream. The interruption point 1326 shows where, in the transmitted signal 1300 and the primary media content 1302, the encoded primary media content 1322 temporarily ends. Thus, the primary media content delivery is interrupted, and delivery of the secondary media content 1304 begins. In particular, the transmitted signal 1300 includes a third data stream conveying the secondary media content 1304 as the encoded secondary media content 1330, which follows the interruption point 1326 in the second data stream.

When the secondary media content 1304 finishes, the streaming media logic 134 resumes streaming the primary media content 1302. Thus, the transmitted signal 1300 includes a fourth data stream conveying the third section of the primary media content 1310 as the encoded primary media content 1332. The streaming media logic 134 resumes playback of the primary media content 1302 from the interruption point 1326. Accordingly, the endpoint 108 receives the complete primary media content.

Table 2 shows an example of interrupt forwarding logic that the interrupt controller 140 may employ to send an interrupt notification to the endpoint 108 or any other systems.

TABLE 2

```
//EXAMPLE of input values
streamName="Traffic1.mp3";
profile="1";
serviceName="Traffic Melbourne in CBD";
//END EXAMPLE
function sendInterrupt(profile:String, streamName:String,
   serviceName:String){
      if(ncVideo){
         ncVideo.call("newInterrupt",null,profile,serviceName,
            streamName);
         displayMessage("Interrupt sent for "+serviceName);
      }else{
         displayMessage("Error: Missing server connection");
      }
}
```

Table 3 shows an example of the streaming media logic 134 interrupt forwarding logic that may be used to communicate an interrupt notification to the endpoint 108.

TABLE 3

```
Client.prototype.newInterrupt = function(profile,serviceName,
streamName)
{
   //calling "interrupt" method for all clients, using broadcast message
within an RTMP stream for delivery to all subscribers
currently streaming
      application.broadcastMsg("interruption",profile,serviceName,
         streamName);
}
```

Table 4 shows an example of client logic 1008 for interrupt reception, processing, and stream handling, with concurrency support.

TABLE 4

```
//incoming broadcast
ncVideo.interruption = function(profile,serviceName, streamName)
{
var adFile;
//if incoming interrupt profile is in subscriber profile, then message will
be processed toProcess=false;
for   (j in myProfile)
{
if      (myProfile[j] == profile)
            toProcess=true;
}
if     (toProcess)
{
adFile=serviceName;
   //setting message pop up
      _root.attachMovie("mc_interruption", "mc_msg", 1, {_x:
      xMess, _y: yMess});
      _root.mc_msg.msg.text = serviceName;
      setProperty("/mc_msg", _visible, 1);
```

TABLE 4-continued

```
        if    (opt_nobreak)
            {
//if opt_nobreak is true primary media stream remains in background,
NetConnection is an object that abstracts the connection between
client and media server while NetStream abstracts the stream that
is using the NetConnection
                if(!adVideo) //netConnection does not exist , opening
                new netConnection
                    {
                    adVideo = new NetConnection( );
                    adVideo.connect(flashServer);
                    }
                if(!ad) //netStream does not exist, opening new netStream
                    {
                    ad = new NetStream(ncVideo);
ad.onPlayStatus = function(iObj:Object)
{
switch (iObj.code)
        {
        //interrupt streaming is ended
        case "NetStream.Play.Complete":
                endInterrupt( );
                break;
        }
}
                    }
//attaching and playing interrupt
                myAdVideo.attachVideo(ad);
                ad.play("mp3:"+adFile, 0,-1,true);
                //attaching audio to stream
                this.createEmptyMovieClip("adAudio",
                this.getNextHighestDepth( ));
                adAudio.attachAudio(ad);
                adSnd = new Sound(adAudio);
                adSnd.setVolume(100);
                saveVolume = actVolume;
                actVolume=actVolume/4;
                snd.setVolume(actVolume);
            }
```

TABLE 4-continued

```
        else
            {
//opt_music is false, stopping music before playing interrupt, ns.time
represents the current streaming length of the primary media stream
received so far
                myTime += ns.time;
                ns.play("mp3:"+adFile, 0,-1,true);
                }
        }
}
//function to be called when interrupt stream is ended
function endInterrupt(Void):Void
{
//removing interrupt message
setProperty("/mc_msg", _visible, 0);
if    (opt_nobreak)
            {
//removing interrupt audio
                actVolume = saveVolume;
                snd.setVolume(actVolume);
                ad.play("mp3:silence", 0, 0, true);
            }
else
            {
//restart playing music from breakpoint
                ns.play("mp3:" + transformPath(_root["TRK"+actTrack].path),
myTime, duration, true);
                track.text="Track " + (1+actTrack);
            }
toProcess = false;        // end ad
}
```

Table 5 shows an example of an application programming interface (API) 150 (FIG. 1) that the media business logic 118 may implement. The client front end 112 and web front end 116 may both interact with the media business logic 118 through the API 150. The API 150 may vary widely depending on the implementation.

TABLE 5

| Function | Example |
| --- | --- |
| Retrieve All Playlists | http://88.48.110.106:7001/NetTunesServlet/RetrieveAllPlaylist?MSISDN=XXXXXXXXX<br>The MSISDN specifies the endpoint for which the playlists will be retrieved. |
| Retrieve Playlist Detail | http://88.48.110.106:7001/NetTunesServlet/RetrievePlaylistDetail?playlistId=xx<br>Parameters:<br>playlistId: id number of the playlist |
| Retrieve All Content | http://88.48.110.106:7001/NetTunesServlet/RetrieveAllContent<br>Retrieves content identifiers for the available in the media database. |
| Update User Profile | http://88.48.110.106:7001/NetTunesServlet/UpdateUserProfile?MSISDN=987654321&traffic=0&weather=0<br>Parameters:<br>MSISDN; traffic; weather.<br>MSISDN specifies the endpoint for which the profile will be updated.<br>Traffic = 0, it sets NO 'Traffic Alert' for that MSISDN<br>Traffic = 1, it sets YES (send) 'Traffic Alert' for that MSISDN<br>The same behavior is applicable for the 'Weather Alert'. |
| Modify Playlist | http://88.48.110.106:7001/NetTunesServlet/UpdatePlaylist?playlist_id=54&name=SubscriberHits&contents=2,3,4,5<br>Parameters:<br>playlist_id: id number of the playlist<br>name: playlist name,<br>contents: the list of ALL content IDs separated by ","<br>Notes:<br>They list of IDs are provided in the playback order, including entries for which no change will be made. |
| Create Playlist | http://88.48.110.106:7001/NetTunesServlet/CreatePlaylist?MSISDN=987654321&name=PlaylistName&contents=2,3,4,5<br>Mandatory parameters:<br>MSISDN, name, contents, specified as noted above for Modify Playlist |
| Delete Playlist | http://88.48.110.106:7001/NetTunesServlet/DeletePlaylist?playlist_id=1<br>Parameters:<br>playlist_id: id number of the playlist |

TABLE 5-continued

| Function | Example |
| --- | --- |
| Create Content | http://88.48.110.106:7001/NetTunesServlet/CreateContent?track_name=vod_name&author=ARTIST&album=xxx&duration=00:01:00&description=songs&image=NETTUNETRACK/Vinc2/2356.jpg&path=NETTUNETRACK/Vinc2/U2-06.mp3&creation_user=USER&category_id=1<br>Parameters:<br>track_name, author, album, duration (hh24:mm:ss), path, creation_user.<br>Notes:<br>creation_user specifies the identifier of the entity creating the content. |
| Delete Content | http://88.48.110.106:7001/NetTunesServlet/DeleteContent?content_id=71<br>Parameters:<br>playlist_id: id number of the playlist |
| Modify Content | http://88.48.110.106:7001/NetTunesServlet/UpdateContent?content_id=75&track_name=xx&author=yyy&album=zzz&duration=00:02:00&path=xxxx&modify_user=yyyyy&image=zzzzzz&description=xxxxxx&category_id=1<br>Parameters:<br>content_id, track_name, author, album, duration (hh24:mm:ss), path, modify_user.<br>Notes:<br>creation_user specifies the identifier of the entity modifying the content. |

Figure 14:
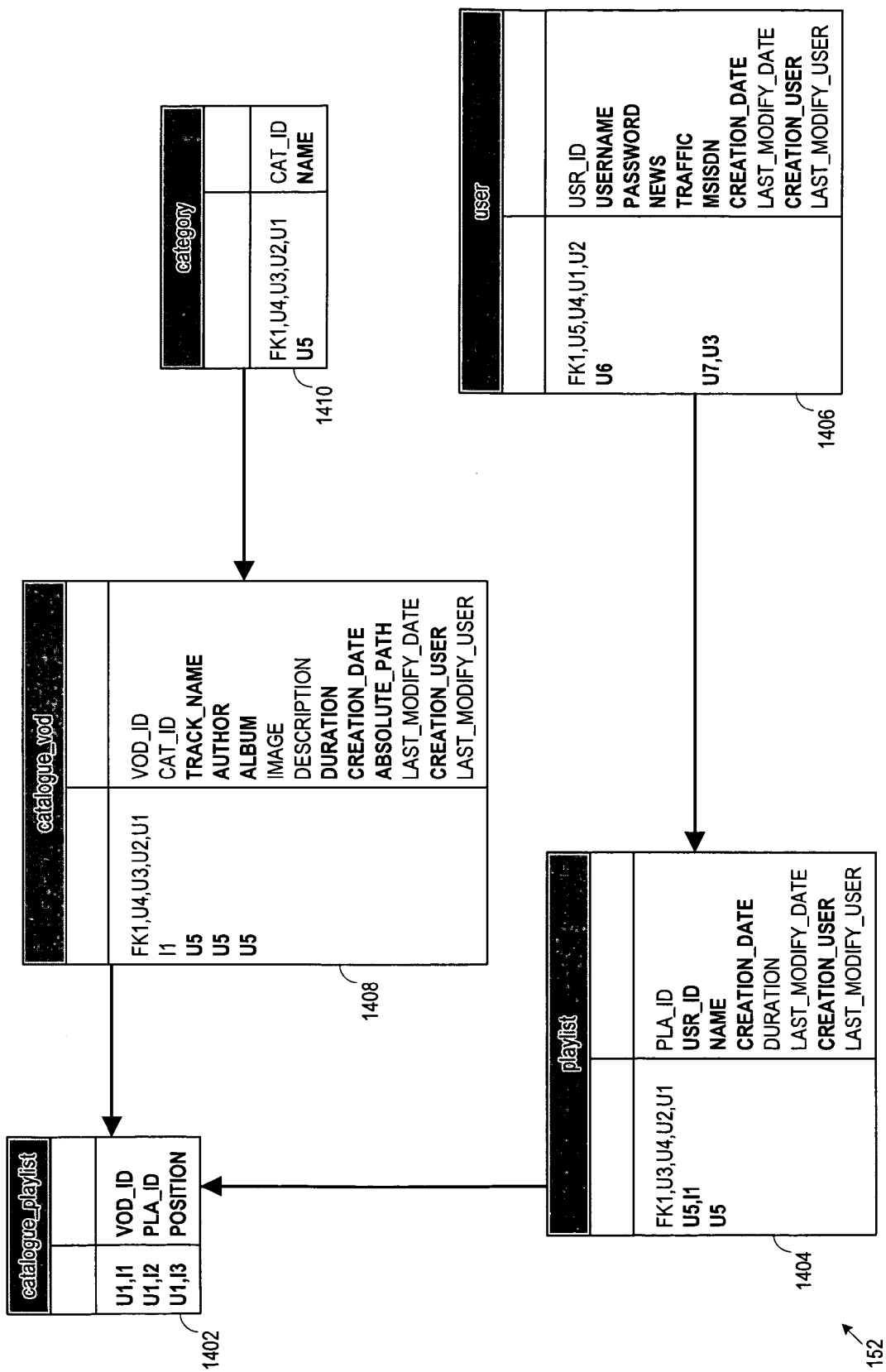
FIG. 14 shows a data model for a media database.

FIG. 14 shows an example data model 152 for the media database 110. Many other data model implementations may instead be used. FIG. 14 shows that the data model 152 includes a playlist catalog table 1402, a playlist table 1404, and a user table 1406. In addition, the data model 152 includes an on-demand content catalog table 1408 and a category table 1410.

The playlist catalog table 1402 bundles together multiple individual playlists defined in the playlist table 1404, each of which may be associated to a user defined in the user table 1406. The user table 1406 also stores content delivery preferences, such as whether news or traffic alerts should be communicated to the user, using the 'News' and 'Traffic' fields. The catalogue table 1408 defines the media that is in the playlist, such as by album, track name, description, and duration. The category table 1410 defines categories that may be assigned to the media.

The systems, including the SO system 104, media server 106, and CMS 102, described above may be implemented in many different ways. The system functionality may be implemented in a single system, or functionally partitioned into other system configurations. As another example, logic or systems implemented as computer-executable instructions or as data structures in memory may be stored on, distributed across, or read from many different types of machine-readable media. The machine-readable media may include RAM, ROM, hard disks, floppy disks, CD-ROMs, a signal, such as a signal received from a network or partitioned into sections and received in multiple packets communicated across a network. The systems may be implemented in software, hardware, or a combination of software and hardware.

Furthermore, the systems may be implemented with additional, different, or fewer components. As one example, a processor or any other logic may be implemented with a microprocessor, a microcontroller, a DSP, an application specific integrated circuit (ASIC), program instructions, discrete analog or digital logic, or a combination of other types of circuits or logic. As another example, memories may be DRAM, SRAM, Flash or any other type of memory. The systems may be distributed among multiple components, such as among multiple processors and memories, optionally including multiple distributed processing systems. Logic, such as programs or circuitry, may be combined or split among multiple programs, distributed across several memories and processors, and may be implemented in or as a function library, such as a dynamic link library (DLL) or other shared library.

Examples of protocols that the systems, modules, and logic may employ to deliver media include the Real Time Messaging Protocol (RTMP) and Real Time Streaming Protocol (RTSP). The FLV (Flash Video) format may be employed for the media streams, and the media server 106 and streaming media logic 134 be implemented with Adobe™ Flash Media Streaming Server software, available from Adobe System Incorporated of San Jose, Calif. As other examples, the media server 106 and streaming media logic 134 may be implemented with a Flash Lite™ server, QuickTime™ streaming server, or Darwin open-source server.

However, any other protocols for streaming audio, video, and data over the Internet between a server and an endpoint may deliver the media content. The protocols may further support endpoint control over the streaming media server. As examples, the protocols may support commands such as "play" and "pause", for flexible media access on the streaming media server.

The transport layer may include Transport Control Protocol (TCP), Real Time Transport Protocol (RTP) or other transport logic. The network layer may route information based on Internet Protocol v4, v6 (i.e., IPv4 or IPv6) or other network layer protocols. The data link layer may include wired or wireless links, such as IEEE 802.11, WiFi, WiMAX, Asynchronous Transfer Mode (ATM), Fiber Distributed Data Interface (FDDI), Ethernet, or other data link layers over optical fiber, coaxial cable, twisted pair or other physical layers.

Interfaces between logic, modules, and systems may be implemented in numerous ways. For example, the interface between the SO system 104 and the interrupt controller 140 may be a Web Services interface. Other examples of interfaces include message passing, such as publish/subscribe messaging, shared memory, and remote procedure calls.

The hardware and software platforms that run on the endpoints may vary widely. As examples, the endpoints may run the Windows CE™ operating system, JAVA ME™ system, Symbian™ operating system, Palm™ operating system. The SO System 104, CMS 102, and media server 106 may be implemented with a general purpose processing platform, such as those available from Sun Microsystems, Hewlett Packard, or International Business Machines and running Unix, Windows™, Linux or other operating systems.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for streaming media from a media server to an endpoint, the method comprising:
    initiating delivery, by the media server, of a primary media stream to the endpoint;
    generating an interrupt notification, with a notification module in communication with the media server, when a secondary media stream is available;
    awaiting an interruption request before interrupting delivery of the primary media stream;
    sending, by the notification module, the interrupt notification to the endpoint;
    receiving, by the notification module, the interruption request from the endpoint;
    interrupting delivery, by the media server, of the primary media stream at an interruption point subsequent to generation of the interrupt notification;
    initiating delivery, by the media server, of the secondary media stream to the endpoint in place of the primary media stream; and
    resuming delivery, by the media server, of the primary media stream to the endpoint from the interruption point when the secondary media stream has finished.

2. The method of claim 1, where initiating comprises:
    initiating delivery of the secondary media stream in place of the primary media stream without establishing a new connection session with the endpoint.

3. The method of claim 1, further comprising:
    sending, by the notification module, the interrupt notification to the endpoint within the primary media stream.

4. The method of claim 1, further comprising:
    by a notification module of the media delivery system:
    obtaining an endpoint location for the endpoint;
    obtaining a location specifier for the secondary media stream; and
    determining that the endpoint location matches the location specifier before interrupting delivery of the primary media stream.

5. A media delivery system comprising:
    a notification module adapted to generate an interrupt notification based on availability of a secondary media stream; and
    a streaming media server adapted to:
        initiate delivery of a primary media stream to an endpoint;
        obtain an interruption request message from the endpoint;
        analyze the interruption request to distinguish a new session request identifier from a concurrent session request identifier in the interruption request;
        interrupt the primary media stream at an interruption point subsequent to the interrupt notification and in response to the interruption request message;
        initiate delivery of the secondary media stream to the endpoint; and
        resume delivery of the primary media stream to the endpoint from the interruption point when the secondary media stream has finished.

6. The media delivery system of claim 5, where:
    the notification module is further adapted to deliver the interrupt notification to the streaming media server.

7. The media delivery system of claim 6, where:
    the streaming media server is further adapted to communicate the interrupt notification to the endpoint within the primary media stream.

8. The media delivery system of claim 5, where:
    the notification module is further adapted to:
    obtain a media characteristic for the secondary media stream;
    obtain an endpoint characteristic for the endpoint; and
    generate the interrupt notification when the endpoint characteristic matches the media characteristic.

9. The media delivery system of claim 8, where the endpoint characteristic comprises an endpoint location for the endpoint.

10. The media delivery system of claim 8, where the endpoint characteristic comprises a subscription characteristic for the endpoint.

11. The media delivery system of claim 5, where the streaming media server is further adapted to:
    resume delivery of the primary media stream to the endpoint from the interruption point by setting up a new streaming session to the endpoint.

12. The media delivery system of claim 5, where the streaming media server is further adapted to:
    resume delivery of the primary media stream to the endpoint from the interruption point without setting up a new streaming session to the endpoint.

* * * * *